(12) United States Patent
Qi

(10) Patent No.: US 8,343,671 B2
(45) Date of Patent: Jan. 1, 2013

(54) FUEL CELL SYSTEM HAVING RECYCLE FUEL CONDUIT IN FLUID COMMUNICATION WITH FUEL CELL ASSEMBLY AND CARBON DIOXIDE REMOVAL UNIT

(75) Inventor: Chunming Qi, Lexington, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 957 days.

(21) Appl. No.: 12/316,802

(22) Filed: Dec. 16, 2008

(65) Prior Publication Data

US 2009/0169931 A1    Jul. 2, 2009

Related U.S. Application Data

(60) Provisional application No. 61/009,418, filed on Dec. 28, 2007.

(51) Int. Cl.
*H01M 8/06* (2006.01)
*H01M 8/04* (2006.01)
*H01M 8/10* (2006.01)

(52) U.S. Cl. ......... 429/412; 429/420; 429/434; 429/479

(58) Field of Classification Search .................. 429/479, 429/412, 434
See application file for complete search history.

(56) References Cited

U.S. PATENT DOCUMENTS

| | | | |
|---|---|---|---|
| 2,886,405 | A | 5/1959 | Benson et al. |
| 3,144,301 | A | 8/1964 | Mayland |
| 3,615,839 | A | 10/1971 | Thompson et al. |

(Continued)

FOREIGN PATENT DOCUMENTS

EP    1 033 769 A1    9/2000

(Continued)

OTHER PUBLICATIONS

"Notification of Transmittal of the International Search Report and the Written Opinion of the International Searching Authority, or the Declaration," from related application PCT/US2008/013764, 12 pp., mailed on Mar. 31, 2009.

(Continued)

*Primary Examiner* — N Drew Richards
*Assistant Examiner* — Michael Jung
(74) *Attorney, Agent, or Firm* — Robert T. Conway; Abel Law Group, LLP

(57) ABSTRACT

A fuel cell system comprises a fuel cell assembly, a carbon-dioxide-removal unit, an anode exhaust conduit connecting the fuel cell assembly and the carbon-dioxide-removal unit, a fuel source, an oxygen source, a fuel conduit connecting, at least in part, the fuel source with the fuel cell assembly, and a recycle conduit connecting the carbon-dioxide-removal unit with at least one of the fuel cell assembly, the fuel conduit and the fuel source. The fuel cell assembly includes at least one fuel cell, each fuel cell including an anode and a cathode. The carbon-dioxide-removal unit removes carbon dioxide that is in a gas phase. The carbon-dioxide-removal unit includes a carbon-dioxide-removing material. The fuel source and the oxygen source are each independently in fluid communication with the fuel cell assembly. The fuel conduit and the recycle conduit are optionally merged into a single recycle-fuel conduit that extends to the fuel cell assembly. The recycle conduit and/or the recycle-fuel conduit directs essentially all gaseous fluid from the carbon-dioxide-removal unit to the fuel cell assembly.

24 Claims, 10 Drawing Sheets

U.S. PATENT DOCUMENTS

| | | | |
|---|---|---|---|
| 3,932,582 | A | 1/1976 | Eickmeyer |
| 4,112,052 | A | 9/1978 | Sartori et al. |
| 4,160,810 | A | 7/1979 | Benson et al. |
| 4,399,111 | A | 8/1983 | Baur et al. |
| 4,751,151 | A | 6/1988 | Healy et al. |
| 4,861,360 | A | 8/1989 | Apffel |
| 5,068,159 | A * | 11/1991 | Kinoshita ............ 429/410 |
| 5,079,103 | A | 1/1992 | Schramm |
| 5,339,633 | A | 8/1994 | Fujii et al. |
| 5,378,442 | A | 1/1995 | Fujii et al. |
| 5,380,600 | A | 1/1995 | Hansen et al. |
| 6,117,404 | A | 9/2000 | Mimura et al. |
| 6,312,655 | B1 | 11/2001 | Hesse et al. |
| 2005/0008907 | A1 | 1/2005 | Isozaki et al. |
| 2005/0014038 | A1 | 1/2005 | Aoyama et al. |
| 2005/0123810 | A1 * | 6/2005 | Balan ............ 429/19 |
| 2005/0214609 | A1 | 9/2005 | McElroy |
| 2005/0271914 | A1 * | 12/2005 | Farooque et al. ........ 429/19 |
| 2006/0115691 | A1 | 6/2006 | Hilmen et al. |
| 2010/0239924 | A1 * | 9/2010 | McElroy et al. ......... 429/423 |

FOREIGN PATENT DOCUMENTS

| | | |
|---|---|---|
| EP | 1 511 110 | 3/2005 |
| JP | 1311572 | 12/1989 |
| JP | 7302609 | 11/1995 |
| WO | WO 00/16426 | 3/2000 |

OTHER PUBLICATIONS

Daneshvar, N. et al., "Carbon Dioxide Equilibrium Absorption in the Multi-Component Systems of $CO_2$ + TIPA + MEA + H20, CO2 + TIPA + Pz + H20 and CO2 + TIPA + H20 at Low CO2 Partial Pressures: Experimental Solubility Data, Corrosion Study and Modeling with Artificial Neural Network," *Separation and Purification Technology*, 37: 135-147 (2004) (No month available).

Dijkstra, J.W. and Jansen, D., "Novel Concepts for $CO_2$ Capture with SOFC," *6th International Conference on Greenhouse Gas Control Technologies*, Kyoto, Japan (Nov. 2002).

Noponen, M., et al. "Experimental Study of Anode Gas Recycling on Efficiency of SOFC," *30th Fuel Cell Seminar*, 5(1): 2006 (No month available).

Xu, Zhikang, et al., "Separation and Fixation of Carbon Dioxide Using Polymeric Membrane Contactor," *First National Conference on Carbon Sequestration*, Washington, D.C. (May 2001).

Notification Concerning Transmittal of International Preliminary Report on Patentability (Chapter 1 of the Patent Cooperation Treaty) for Int'l Application No. PCT/US2008/013764, 7 pp., mailed Jul. 8, 2010.

* cited by examiner

US 8,343,671 B2

FUEL CELL SYSTEM HAVING RECYCLE FUEL CONDUIT IN FLUID COMMUNICATION WITH FUEL CELL ASSEMBLY AND CARBON DIOXIDE REMOVAL UNIT

RELATED APPLICATIONS

This application claims the benefit of U.S. Provisional Application No. 61/009,418, filed on Dec. 28, 2007. The entire teachings of the above application is incorporated herein by reference.

BACKGROUND OF THE INVENTION

Fuel cells can offer potentially clean, quiet and efficient power generation. Unlike thermal energy based engines, fuel cells use an electrochemical or battery-like process to convert the chemical energy associated with the conversion of hydrogen gas (and carbon monoxide for high temperature fuel cells) into water (and carbon dioxide for high temperature fuel cells) into electricity. Among various types of fuel cells, solid oxide fuel cells (SOFC) use hard ceramic compounds of metal oxides (e.g., calcium or zirconium oxides) to form their components, for example, electrodes, electrolytes and interconnects. Typically, in solid oxide fuel cells, oxygen gas ($O_2$) is reduced to oxygen ions ($O^{2-}$) at the cathode, and a fuel gas, such as hydrogen ($H_2$) or a hydrocarbon, such as methane ($CH_4$), is oxidized with the oxygen ions to form water and carbon dioxide (from hydrocarbon) at the anode. If a hydrocarbon is used as the fuel gas, then carbon dioxide ($CO_2$) is also produced and becomes part of the exhaust from the anode of SOFC (anode exhaust). The anode exhaust typically includes about 15% to about 30% unreacted fuel gas. Despite the advantages of clean and quiet power generation, fuel cell systems have faced a number of formidable market entry issues resulting from product immaturity, over-engineered system complexity, fuel efficiency, etc. Fuel efficiency can be increased by employing larger surface areas of the anode and cathode, or by increasing the number of fuel cells in a fuel cell stack. However, these approaches typically result in increases in the size of the fuel cell stack. It is a considerable challenge for an SOFC stack to achieve high fuel utilization efficiency due to the limitation of cell voltage and uniform fuel distribution.

Therefore, there is a need for developing methods of increasing fuel efficiency in fuel cell systems, and for developing fuel cell systems having high fuel efficiency, and in particular fuel cell systems of relatively small size.

SUMMARY OF THE INVENTION

The present invention generally relates to a fuel cell system that includes a fuel cell assembly and a carbon-dioxide-removal unit that removes at least a portion of gaseous carbon dioxide from anode exhaust, and directs essentially all gaseous fluid resulted from carbon-dioxide removal to the fuel cell assembly, and to a method of recycling unreacted fuel in the anode exhaust in such a fuel cell system.

In one embodiment, the present invention is directed to a fuel cell system that includes a fuel cell assembly, a carbon-dioxide-removal unit, an anode exhaust conduit connecting the fuel cell assembly and the carbon-dioxide-removal unit, a fuel source, an oxygen source, a fuel conduit connecting, at least in part, the fuel source with the fuel cell assembly, and a recycle conduit connecting the carbon-dioxide-removal unit with at least one of the fuel cell assembly, the fuel conduit and the fuel source. The fuel cell assembly includes at least one fuel cell, each fuel cell including an anode and a cathode. The carbon-dioxide-removal unit removes carbon dioxide that is in a gas phase. In one embodiment, the carbon-dioxide-removal unit further removes a portion of water from the anode exhaust. In another embodiment, the carbon-dioxide-removal unit further removes at least a portion of sulfur compounds in a fuel gas. The carbon-dioxide-removal unit includes a carbon-dioxide-removing material. The fuel source and the oxygen source are each independently in fluid communication with the fuel cell assembly. The fuel conduit and the recycle conduit are optionally merged into a single recycle-fuel conduit that extends to the fuel cell assembly. The recycle and/or recycle-fuel conduit directs essentially all gaseous fluid from the carbon-dioxide-removal unit to the fuel cell assembly. In one embodiment, the carbon-dioxide-removal unit further removes at least a portion of water from the anode exhaust. In another embodiment, the carbon-dioxide removal unit further removes at least a portion of sulfur compounds from a fuel gas. In yet another embodiment, the fuel cell system also includes a water-gas-shift unit that includes one or more catalysts that convert water and carbon monoxide into hydrogen and carbon dioxide, wherein the water-gas-shift unit is at a portion of the anode exhaust conduit extending between the fuel cell assembly and the carbon-dioxide-removal unit. In a specific embodiment, the fuel cell system also includes a bleed conduit branching from the anode exhaust conduit at a point between the fuel cell assembly and the fuel source, wherein the bleed conduit directs at least a portion of fluid from the anode exhaust conduit to a bleed exhaust. In another specific embodiment, the fuel cell system also includes an air-heat-exchanger unit at a point downstream of the bleed conduit, in which heat exchange occurs between fluid received from the bleed conduit and a second fluid having a lower temperature than the fluid received from the bleed conduit. In yet another specific embodiment, the air heat exchanger is between, and in fluid communication with, the oxygen source and the cathode of the fuel cell assembly, and oxygen-containing fluid from the oxygen source is the second fluid. In one embodiment, the fuel cell system also includes a cooling unit at a portion of the anode exhaust conduit extending between the fuel cell assembly and the carbon-dioxide-removal unit. In a specific embodiment, the cooling unit is between the water-gas-shift unit and the carbon-dioxide-removal unit. In another embodiment, the carbon-dioxide-removal unit further includes a cooling component. In yet another embodiment, the carbon-dioxide-removal housing further defines a carbon-dioxide-removing-material inlet and a carbon-dioxide-removing-material outlet, and the fuel cell system further includes a regeneration unit that regenerates spent carbon-dioxide-removing material, wherein the regeneration unit is in fluid communication with the carbon-dioxide-removing-material outlet and with the carbon-dioxide-removing-material inlet, wherein the regeneration unit regenerates spent carbon-dioxide-removing material. In a specific embodiment, the regeneration unit further includes a heating component that heats spent carbon-dioxide-removing material at the regeneration unit, and a cooling component that lowers the temperature of regenerated carbon-dioxide-removing material. In another embodiment, the fuel cell system further includes an anode heat exchanger at a portion of the anode exhaust conduit extending between the fuel cell assembly and the water-gas-shift unit, in which heat exchange occurs between fluid of the anode exhaust conduit and a second fluid having a lower temperature than the fluid of the anode exhaust conduit. In a specific embodiment, the anode heat exchanger is at the anode exhaust conduit, and at the recycle conduit, recycle-fuel conduit or the fuel conduit, and the heat exchange occurs between the fluid of the anode exhaust conduit and the fluid of the recycle conduit, recycle-fuel conduit or the fuel conduit. In another specific embodiment, at least a portion of the anode exhaust conduit between the anode heat exchanger and the cooling unit covers at least a portion of the regeneration unit. In yet another embodiment, the fuel cell system further includes a reformer or pre-reformer that includes a catalyst that converts fuel gas into hydrogen gas, wherein the reformer or pre-reformer is either at the recycle-fuel conduit or at the recycle and the fuel conduits. In a specific embodiment, the fuel conduit and the recycle conduit are merged into the recycle-fuel conduit at a position between the carbon-dioxide-removal unit and the anode heat exchanger, or between the anode heat exchanger, and the reformer or pre-reformer. In one embodiment, the fuel cell system further includes a by-pass conduit branching from the anode exhaust conduit at a point between the water-gas-shift unit and cooling unit, wherein the by-pass conduit extends either directly to the fuel cell assembly, or via at least one of the recycle conduit, the fuel conduit and the recycle-fuel conduit, by-passing the carbon-dioxide-removal unit. In a specific embodiment, the fuel cell assembly includes a first fuel cell and a second fuel cell, wherein the first fuel cell includes a first anode inlet and a first anode outlet, each of the first anode inlet and the first anode outlet independently being in fluid communication with the anode of the first fuel cell, and wherein each of the second anode inlet and the second anode outlet independently are in fluid communication with the anode of the second fuel cell. In one embodiment, the first anode outlet of the first fuel cell is in fluid communication with a carbon dioxide inlet of the carbon-dioxide-removal unit via the anode exhaust conduit, and wherein the second anode inlet of the second fuel cell is in fluid communication with an outlet of the carbon-dioxide-removal unit via the recycle or recycle-fuel conduit. In another embodiment, the first anode inlet of the first fuel cell is in fluid communication with the fuel source through the fuel conduit. In yet another embodiment, the fuel cell system further includes a second exhaust conduit connecting the second anode outlet of the second fuel cell to the first anode inlet of the first fuel cell. In a specific embodiment, the fuel cell conduit and the second exhaust conduit are merged into a single conduit that extends to the first anode inlet of the first fuel cell. In some embodiments, the carbon-dioxide-removing-material is a carbon-dioxide absorbent. In some specific embodiments, the carbon-dioxide absorbent is selected from the group consisting of monoethanolamine, diethanolamine, triethanolamine, methyl-diethanolamine, di-isopropanolamine, 2-amino-2-methyl-1-propanol, and alkaline or alkaline earth metal carbonate.

In another embodiment, the present invention is directed to a method of recycling anode exhaust in a fuel cell system. In the method, anode exhaust including carbon dioxide is directed from at least one said fuel cell to a carbon-dioxide-removal unit that includes a carbon-dioxide-removing material. At the carbon-dioxide-removal unit, at least a portion of gaseous carbon dioxide is removed from the anode exhaust with the carbon-dioxide-removing material to thereby form carbon dioxide-deficient anode exhaust. Essentially all of the carbon dioxide-deficient anode exhaust is directed to at least one said fuel cell of the fuel cell assembly to thereby recycle the anode exhaust. In one embodiment, the carbon-dioxide-removal unit further removes at least a portion of sulfur from a fuel gas. In another embodiment, the method further includes the step of converting at least a portion of carbon monoxide and water from the anode exhaust into carbon dioxide and hydrogen at a water-gas-shift unit that includes one or more catalysts that convert water and carbon monoxide into hydrogen and carbon dioxide, prior to removing carbon dioxide from the anode exhaust. In a specific embodiment, the method further includes the steps of directing at least a portion of the anode exhaust that has gone through the water-gas-shift unit to a bleed exhaust, and directing the rest of the anode exhaust to the carbon-dioxide-removal unit. In another specific embodiment, the portion of the anode exhaust that is directed to the bleed exhaust is directed to the bleed exhaust via an air heat exchanger, and the method further includes the step of directing an oxygen stream from an oxygen source to the at least one said fuel cell via the air heat exchanger whereby heat exchange occurs between the anode exhaust and the oxygen stream. In yet another embodiment, the method further includes the step of directing cathode exhaust from at least one said fuel cell to the air heat exchanger to oxidize fuel in the bleed exhaust. In another embodiment, the method further includes the step of cooling the anode exhaust directed from the water-gas-shift unit to the carbon-dioxide-removal unit at a cooling unit, prior to the removal of carbon dioxide at the carbon-dioxide-removal unit, to thereby remove at least a portion of water from the anode exhaust. In some embodiments, the carbon-dioxide-removing-material is a carbon-dioxide absorbent or a membrane that is selectively permeable to at least carbon dioxide. In some specific embodiments, the membrane is selected from the group consisting of at least one of polymer, ceramic, and glass membranes, and the carbon-dioxide-removing-material is a carbon-dioxide absorbent selected from the group consisting of monoethanolamine, diethanolamine, triethanolamine, methyl-diethanolamine, di-isopropanolamine, 2-amino-2-methyl-1-propanol, and alkaline or alkaline-earth metal carbonate.

With the present invention, near 100% fuel utilization can be achieved by recycling anode exhaust with carbon dioxide and water removal, significantly improving system efficiency. The relatively high fuel concentration due to recycling, with carbon dioxide removal and at least partial water removal, results in a relatively high fuel (e.g., $H_2$, CO and $CH_4$)-to-product (i.e., $H_2O$ and $CO_2$) ratio, which can provide a relatively high open circuit voltage (OCV) and a relatively high cell voltage (high fuel cell efficiency). Generally, operating a fuel cell system at a relatively high cell voltage can provide relatively a long stack life. In addition, the operation of a fuel cell system at a relatively high cell voltage results in relatively low heat generation at the fuel cell(s) of the fuel cell system, and, in turn, relatively low thermal stress on the fuel cell(s).

The present invention can employ a water-gas-shift unit that converts carbon monoxide and water, from anode exhaust, into hydrogen gas and carbon dioxide (i.e., water splitting), wherein the generated carbon dioxide is removed at the carbon-dioxide-removal unit, together with the carbon dioxide from the fuel cell assembly. Water splitting increases the concentration of hydrogen gas, relative to the concentration of carbon-monoxide, of the recycle stream that is directed from the carbon-dioxide-removal unit to the fuel cell assembly (directly or indirectly), resulting in high system efficiency.

In a solid oxide fuel cell (SOFC) system of the invention, relatively high electric efficiency, for example, between about 50% and 70% electric efficiency, compared to conventional between about 40% and about 50% electric efficiency can be achieved due to higher efficiency of fuel utilization made possible by removing at least a portion of gaseous carbon dioxide from anode exhaust and directing essentially all gaseous fluid resulted from carbon dioxide removal to the fuel cell assembly. The present invention can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel as used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

DETAILED DESCRIPTION OF THE INVENTION

Figure 1A:
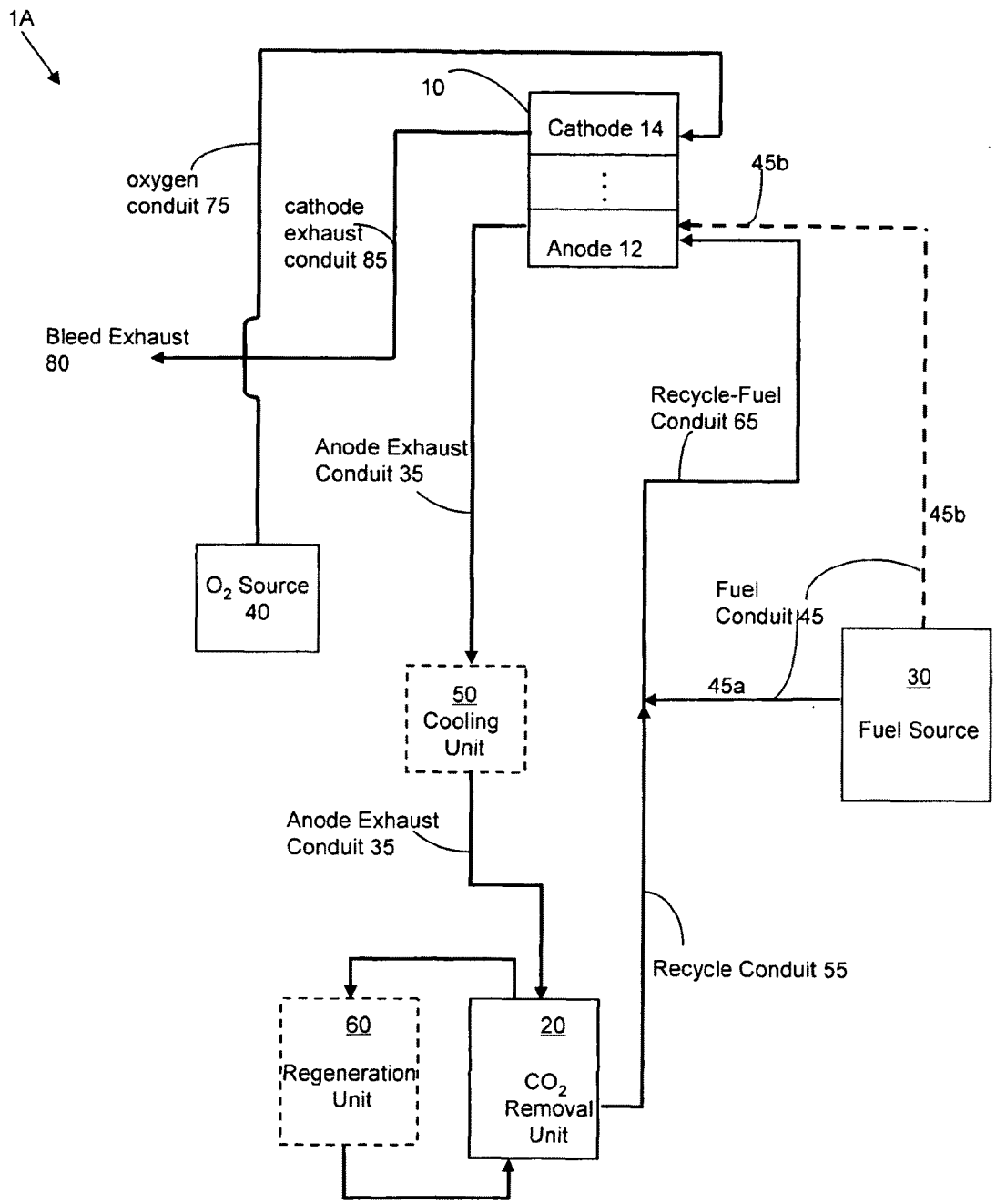
FIG. 1A is a schematic drawing of one embodiment of a fuel cell system of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. In the figures, an optional unit(s) or component(s), and an alternative conduit(s) are indicated with a dashed box and a dashed arrow, respectively.

Figure 1B:
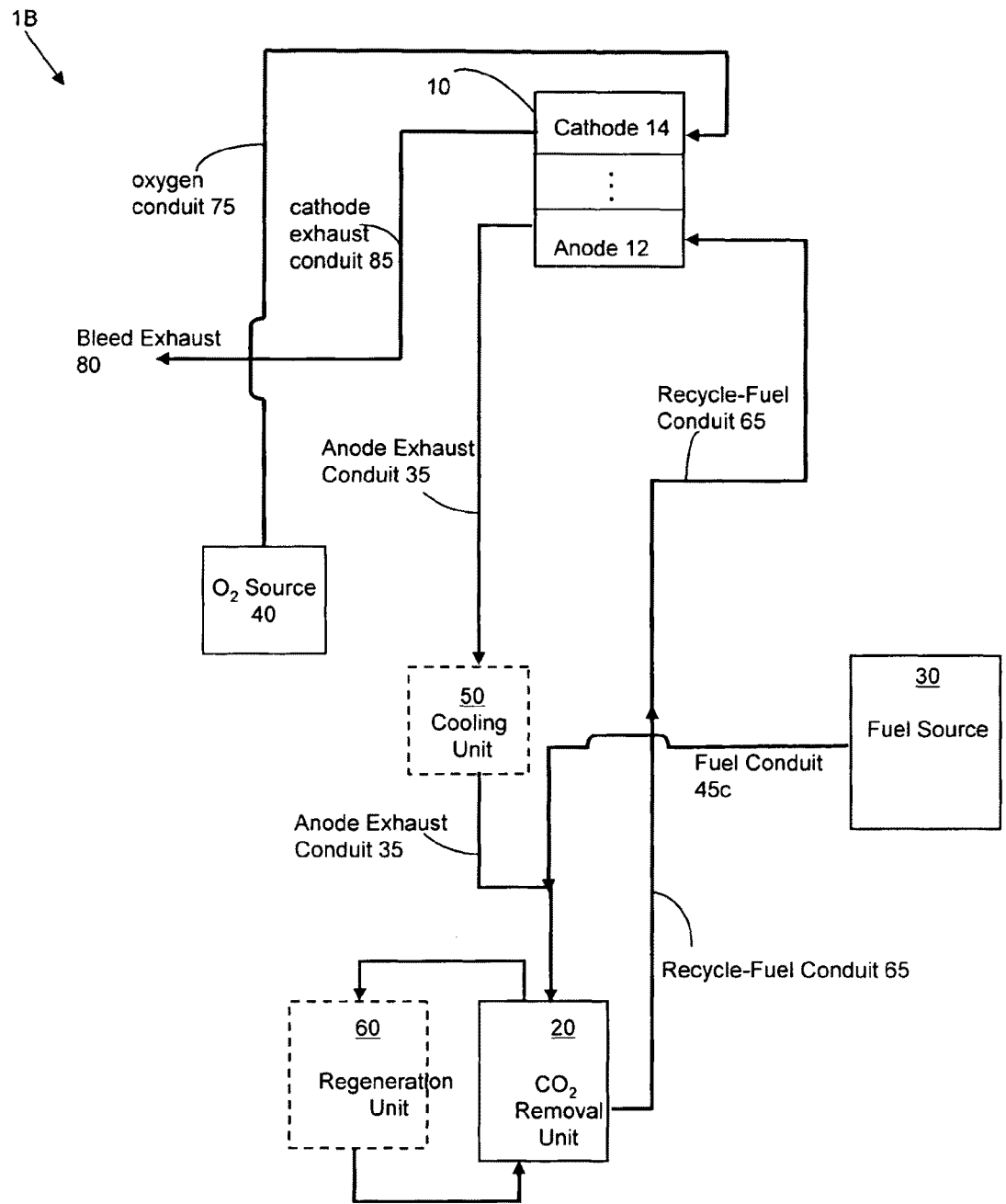
FIG. 1B is a schematic drawing of another embodiment of a fuel cell system of the invention.

FIGS. 1A and 1B show certain embodiments of the fuel cell systems of the invention, fuel cell system 1 (hereinafter, collectively referring to fuel cell system 1A-1B of FIGS. 1A-1B and fuel cell systems 1C-1F of FIGS. 2, 5 and 6 which are described below). Fuel cell system 1 includes fuel cell assembly 10; carbon-dioxide ($CO_2$)-removal unit 20; anode exhaust conduit 35 connecting fuel cell assembly 10 and $CO_2$-removal unit 20; fuel source 30 that is in fluid communication with fuel cell assembly 10; oxygen source 40 that is in fluid communication with fuel cell assembly 10; fuel conduit 45 (collectively referring to fuel conduits 45a and 45b of FIG. 1A, and fuel conduit 45c of FIG. 1B), at least in part, connecting fuel source 30 with fuel cell assembly 10; recycle conduit 55 connecting $CO_2$-removal unit 20 with at least one of fuel cell assembly 10, fuel conduit 45 and fuel source 30; oxygen conduit 75, at least in part, connecting oxygen source 40 with fuel cell assembly 10; and cathode exhaust conduit 85 that directs cathode exhaust from fuel cell assembly 10 to exhaust 80. Optionally, recycle conduit 55 is merged with fuel conduit 45 into recycle-fuel conduit 65. As shown in FIGS. 1A and 1B, recycle conduit 55 or recycle-fuel conduit 65 directs essentially all gaseous fluid from carbon-dioxide ($CO_2$)-removal unit 20 to fuel cell assembly 10. In one embodiment, fuel cell system 1 optionally also includes cooling unit 50 between fuel cell assembly 10 and $CO_2$-removal unit 20 that lowers the temperature of the anode exhaust of anode exhaust conduit 35. In another embodiment, fuel cell system 1 optionally also includes regeneration unit 60 that regenerates a spent $CO_2$-removing material. Regeneration unit 60 is in fluid communication with $CO_2$-removal unit 20.

Figure 2:
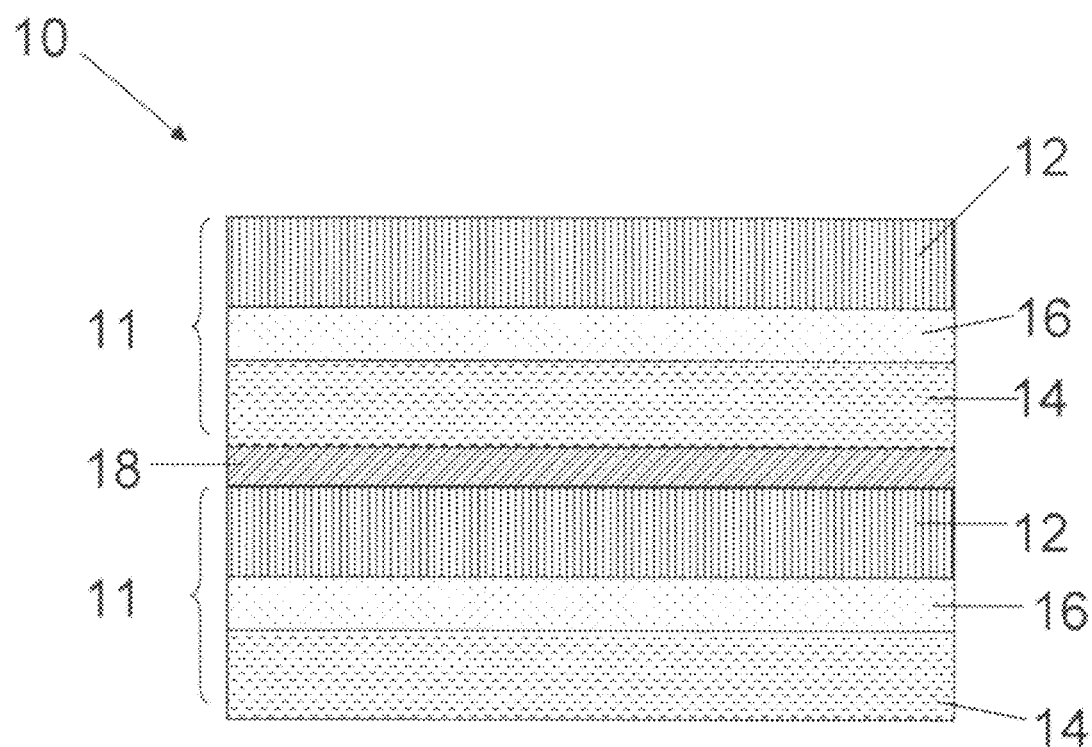
FIG. 2 is a schematic drawing of a fuel cell assembly employed in the invention.

Generally, fuel cell 10 includes at least one fuel cell 11, as shown in FIG. 2. Each fuel cell 11 includes anode 12, cathode 14, and electrolyte 16 between anode 12 and cathode 14. When a plurality of fuel cells 11 are employed, fuel cells 11 are connected to each other via interconnect 18.

Referring back to FIGS. 1A and 1B, in fuel cell system 1, anode exhaust from anode 12 of fuel cell assembly 10 is directed to $CO_2$-removal unit 20 that removes at least a portion of gaseous $CO_2$ from the anode exhaust to thereby form $CO_2$-deficient anode exhaust. As shown in FIGS. 1A and 1B, recycle conduit 55 and/or recycle-fuel conduit 65 directs essentially all gaseous fluid, such as the $CO_2$-deficient anode exhaust in gas phase, from $CO_2$-removal unit 20 to fuel cell assembly 10.

$CO_2$-removal unit 20 includes a $CO_2$-removing material that removes $CO_2$ in a gas phase. Any suitable $CO_2$-removing material known in the art can be employed in the invention. Suitable examples include $CO_2$ absorbents, membranes permeable to $CO_2$, and $CO_2$ adsorbents (e.g., molecular sieves). Specific examples of $CO_2$ absorbents include mono-ethanol amine (MEA), di-ethanol amine (DEA), tri-ethanol amine, methyl-di-ethanol amine, di-isopropanol amine, 2-amino-2-methyl-1-propanol, alkaline metal carbonates (e.g., potassium carbonate), and alkaline-earth metal carbonates (e.g., calcium carbonate). $CO_2$-permeable membranes includes polymer-, ceramic- or nanotube-based membranes. Ceramic membranes includes silica-based and zeolite-based membranes. Specific examples of $CO_2$-permeable polymer membranes include polydimethylsiloxane (PDMS) and cross-linked poly(ethylene glycol) diacrylate (PEGda). In one embodiment, a $CO_2$ absorbent is employed, specifically mono-ethanol amine. In another embodiment, an alkaline metal carbonate or an alkaline earth metal carbonate is employed as a $CO_2$ absorbent. When such a metal carbonate is employed, specifically MEA and/or DEA is also employed (e.g., in a catalytic amount). In another embodiment, a $CO_2$-permeable membrane is employed. In a specific embodiment, the $CO_2$-permeable membrane is a membrane that can be operated at ambient temperature to about 300° C. for polymer membranes, and higher temperatures for ceramic membranes.

Figure 3A:
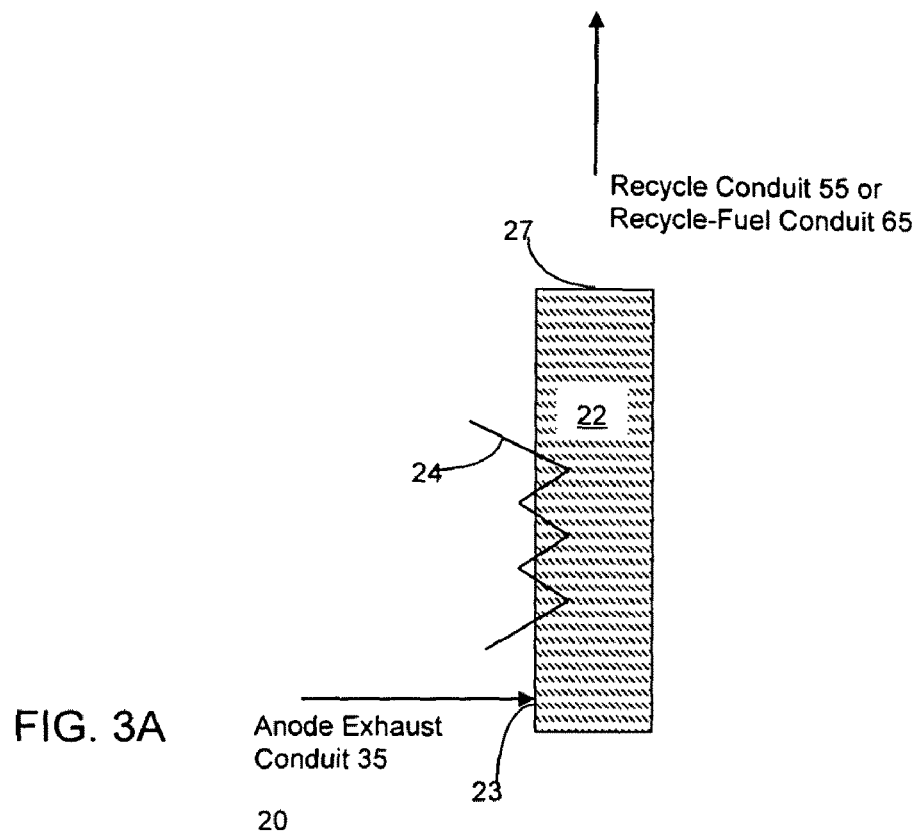
FIG. 3A is a schematic drawing of a carbon-dioxide-removal unit employed in the invention.

As shown in FIG. 3A, $CO_2$-removal unit 20 includes $CO_2$-removing material 22 and optionally further includes cooling component 24 to cool fluid of $CO_2$-removal unit 20 to a desired temperature or temperature range. Generally, anode exhaust directed into $CO_2$-removal unit 20 through inlet 23 has a relatively wide temperature range, for example, between ambient temperature and about 500° C. When $CO_2$-removing material 22 has a $CO_2$-removing temperature (i.e., a temperature that can effectively remove gaseous $CO_2$) lower than the temperature of the anode exhaust, cooling component 24 is employed to cool the anode exhaust at $CO_2$-removal unit 20 to the desired absorption temperature or temperature range. For example, mono-ethanol amine has an absorption temperature between about 40° C. and about 60° C., and a polymeric $CO_2$-permeable membrane can be operated at a temperature from about 100° C. to about 300° C., depending on the membrane material. Generally, a ceramic $CO_2$-removing material can be operated at a relatively high temperature, for example, from about 100° C. to the stack operating temperature, and in an embodiment employing a ceramic $CO_2$-removing material, cooling component 24 may not be required. With certain $CO_2$-removing materials 22, the $CO_2$ removal processes can be exothermic, generating heat. In such cases, even when the temperature of the anode exhaust introduced into carbon-dioxide-removal unit 20 is not greater than a $CO_2$-removing temperature or temperature range of the $CO_2$-removing materials, cooling component 24 can be employed to cool fluid of $CO_2$-removal unit 20.

In a specific embodiment, $CO_2$-removal unit 20 includes $CO_2$-removing material 22 that has a $CO_2$-removing temperature or temperature range above ambient temperature, specifically above about 18° C. In one example, the $CO_2$-removing temperature or temperature range is in a range of between about ambient temperature and about 800° C. In another example, the $CO_2$-removing temperature or temperature range is in a range of between about ambient temperature and about 300° C. In yet another example, the $CO_2$-removing temperature or temperature range is in a range of between about ambient temperature and about 200° C. In yet another example, the $CO_2$-removing temperature or temperature range is in a range of between about ambient temperature and about 100° C.

In another specific embodiment, $CO_2$-removal unit 20 includes $CO_2$-removing material 22 that has a $CO_2$-removing temperature lower than about 100° C., such as between about 40° C. and about 100° C., or between about 40° C. and about 60° C.; and further includes cooling component 24, to cool the anode exhaust at $CO_2$-removal unit 20. In this specific embodiment, water from the anode exhaust that is directed to $CO_2$-removal unit 20 through inlet 23 can also be removed together with $CO_2$, and $CO_2/H_2O$-deficient anode exhaust is directed to recycle conduit 45 through outlet 27.

Figure 3B:
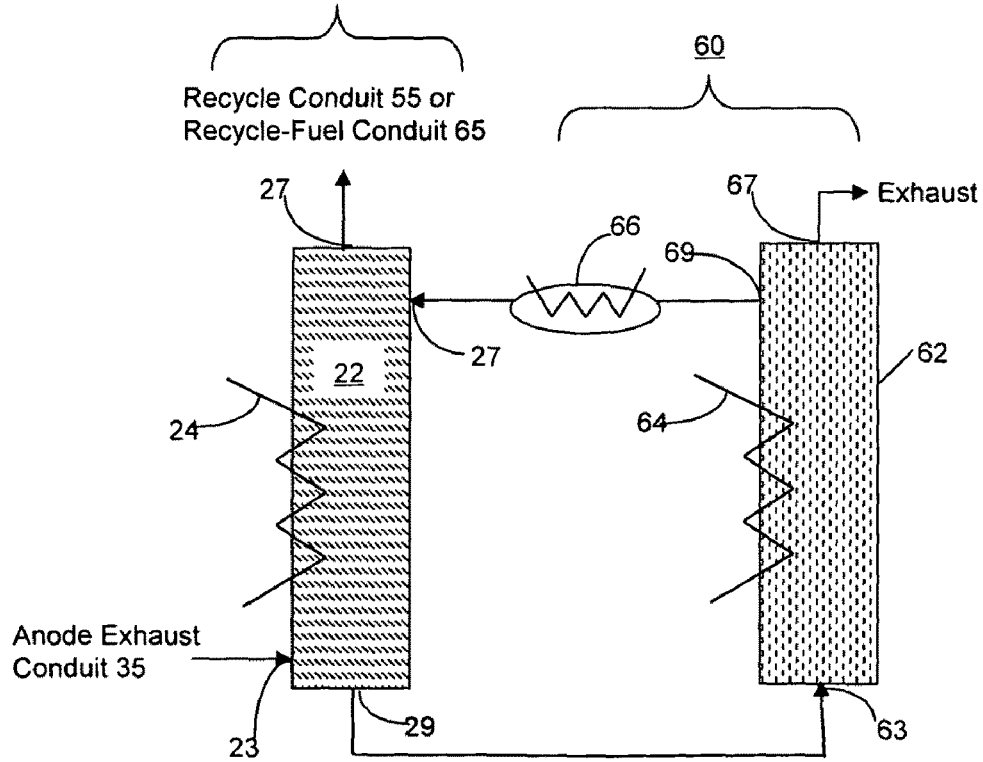
FIG. 3B is a schematic drawing of a carbon-dioxide-removal unit integrated with a regeneration unit, employed in one embodiment of the invention.

$CO_2$-removing materials that have been used for removing $CO_2$ (spent $CO_2$-removing material) at $CO_2$-removing unit can be regenerated. Regeneration of $CO_2$-removing materials can be done on site or off site. In a specific embodiment, regeneration of $CO_2$-removing materials is conducted on site by the use of regeneration unit 60 of fuel cell system 1. As shown in FIG. 3B, regeneration unit 60 includes regenerator 62, heating component 64, inlet 63 that receives spent $CO_2$-removing material from $CO_2$-removal unit 20, outlet 67 that exits $CO_2$-containing exhaust, outlet 69 that exits regenerated $CO_2$-removing material to $CO_2$-removal unit 20, and cooling component 66. Regenerator 62 regenerates spent $CO_2$-removing material to form $CO_2$ and regenerated $CO_2$-removing material by the use of heating component 64. In some specific embodiments, at least a portion of water included in the spent $CO_2$-removing material also is removed at regeneration unit 60. For example, heating the spent $CO_2$-removing materials can generate water vapor, in addition to gaseous $CO_2$, and the generated water vapors can exit to exhaust.

Figure 4:
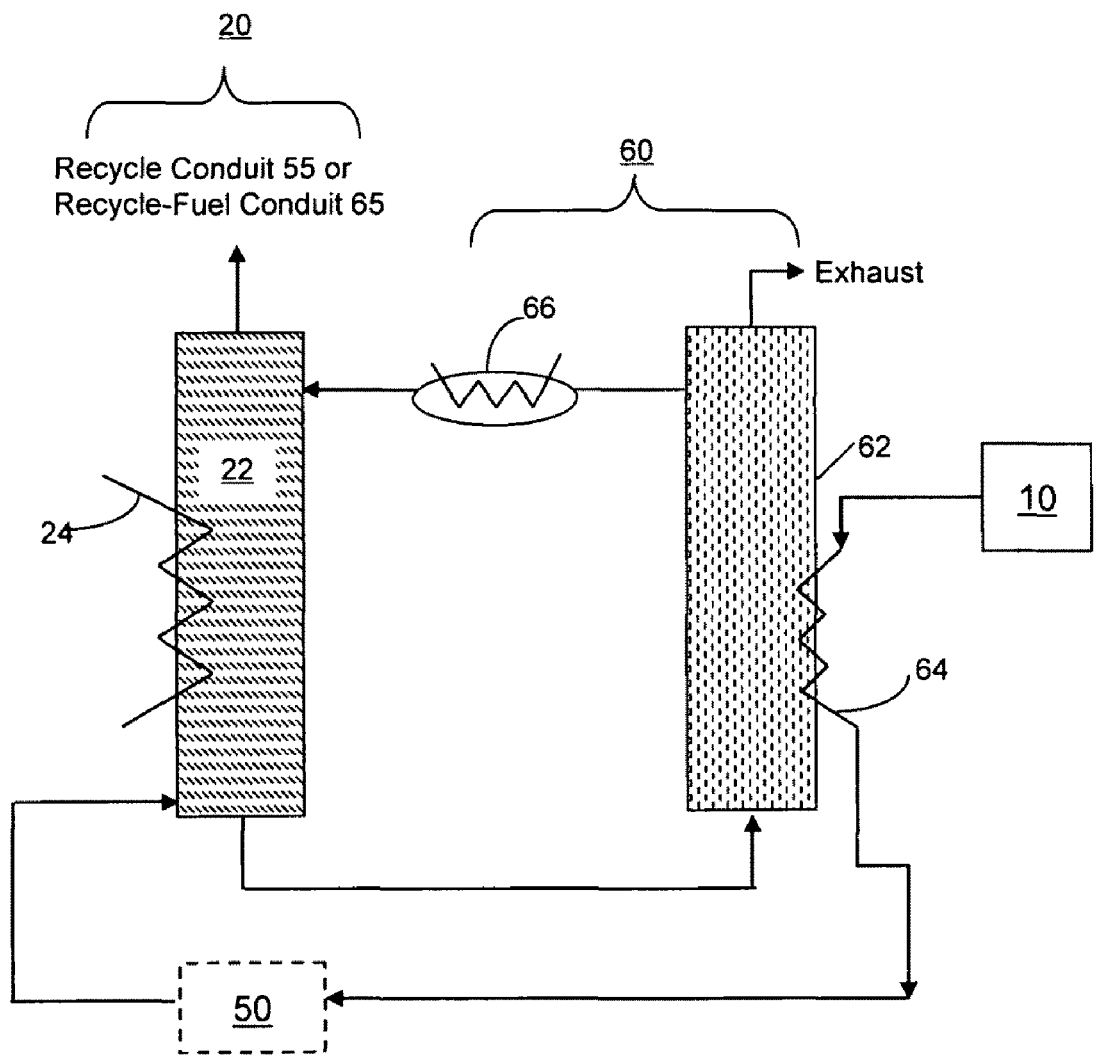
FIG. 4 is a schematic drawing of another carbon-dioxide-removal unit integrated with a regeneration unit, employed in one embodiment of the invention shown in FIG. 5.

Any suitable heating means can be employed in the invention for heating component 64. Specific examples include a heat exchanger known in the art. Liquid fluid circulating between the carbon-dioxide-removal unit and the regeneration unit is pumped by a mechanical pump or bubble pump. The bubble pump is preferred because it does not require electrical power. In one specific embodiment, heat from the anode exhaust of anode exhaust conduit 35 at a portion between fuel cell assembly 10 and $CO_2$-removal unit 20 is employed for heating component 64. As shown in FIG. 4, in this embodiment, at least a portion of anode exhaust conduit 35 between fuel cell assembly 10 and $CO_2$-removal unit 20 covers at least a portion of regenerator 62 and functions as heating component 64. When fuel cell system 1 includes cooling unit 50 that lowers the temperature of the anode exhaust of anode exhaust conduit 35, preferably, the portion of anode exhaust conduit employed for heating component 64 of regeneration unit 60 is between fuel cell assembly 10 and cooling unit 50 (see FIG. 4).

Referring back to FIGS. 1A and 1B, in fuel cell system 1, generally, oxygen-gas-containing stream is directed from $O_2$ source 40 to cathode 14 of fuel cell system 1, at least in part, via oxygen conduit 75. Cathode exhaust from cathode 14 of fuel cell assembly 10 generally is directed to gas exhaust 80 via cathode exhaust conduit 85. The oxygen-gas-containing stream can be directed from $O_2$ source 40 to cathode 14 directly, or via an air heat exchanger or burner. Also, the cathode exhaust can be directed from cathode 14 to gas exhaust 80 directly, or via an air heat exchanger or burner. The embodiments employing an air heat exchanger or burner will be described below with respect to FIGS. 5-8.

Suitable examples of fuel source 30 includes hydrogen gas, natural gas and other hydrocarbon fuel sources. Suitable examples of oxygen source 40 include oxygen gas and a gaseous stream containing oxygen gas, such as air.

Figure 5:
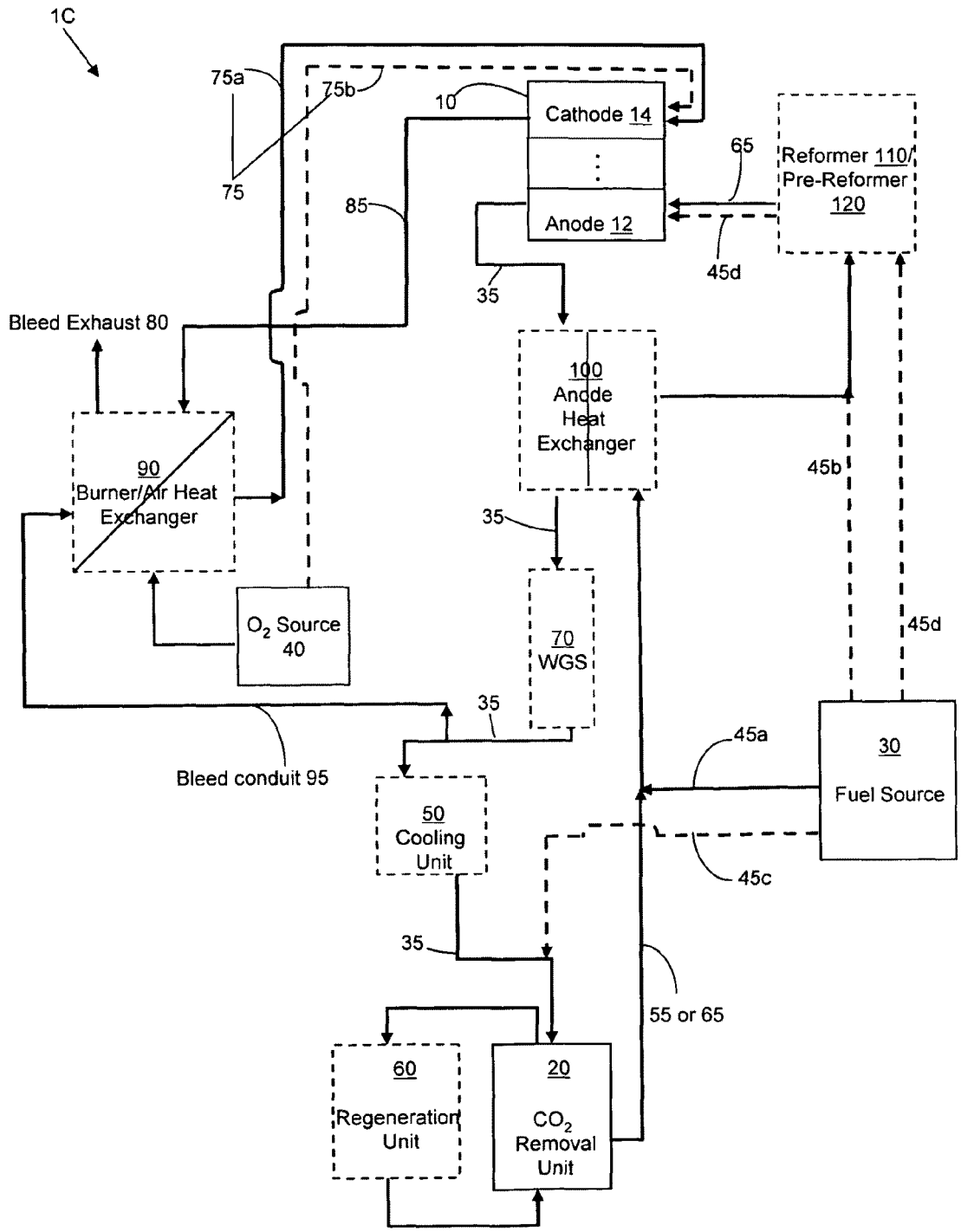
FIG. 5 is a schematic drawing of another embodiment of a fuel cell system of the invention.

Referring to FIG. 5, in a specific embodiment, fuel cell system 1 further includes water-gas-shift unit 70 between fuel cell assembly 10 and $CO_2$-removal unit 20, specifically between fuel cell assembly 10 and cooling unit 50. Water-gas-shift unit 70 includes one or more catalysts that convert water and carbon monoxide into $H_2$ and $CO_2$, which generally is referred to as a "water-gas-shift reaction" or "water splitting." The water-gas-shift reaction is a chemical reaction in which water and carbon monoxide are converted into $H_2$ and $CO_2$. Any suitable catalyst known in the art for the water-gas-shift reaction can be employed in the invention. Examples of suitable catalysts include iron oxide ($Fe_3O_4$, magnetite), iron oxide containing 8-14 wt % of $Cr_2O_3$, Fe—Al based catalysts, precious metal based catalysts such as platinum (Pt), and copper-zinc based catalysts. In this embodiment, the $CO_2$ generated by the water-gas-shift reaction is removed at $CO_2$-removal unit 20, together with the $CO_2$ from fuel cell assembly 10.

As shown in FIG. 5, in another specific embodiment, fuel cell system 1 further includes water-gas-shift unit 70 between fuel cell assembly 10 and $CO_2$-removal unit 20, specifically between fuel cell assembly 10 and cooling unit 50; and bleed conduit 95 branching from anode exhaust conduit 35 at a point between the anode exhaust of the fuel cell and the fuel source. In this embodiment, fuel from fuel source 30 is directed to CO2-removal unit 20 through fuel conduit 45c. Bleed conduit 95 directs at least a portion of fluid from anode exhaust conduit 35 to burner 90 and bleed exhaust 80. Generally, during operation of fuel cell system 1, the fluid subject to leak from anode exhaust conduit 35 through bleed conduit 95 is anode exhaust. During operation of fuel cell system 1, the bleed of anode exhaust from anode exhaust conduit 35 through bleed conduit 95 can be continuous (e.g., between almost 0% and about 5% bleed depending on the amount of inert gas accumulation in the recycle stream) or periodic with substantial bleed during operation of fuel cell system 1. This leakage of anode exhaust, periodically, or continuously but with a substantially small amount (e.g., almost 0% to about 5% bleed), from anode exhaust conduit 35 can remove at least a portion of any inert gas species, such as nitrogen gas, from the anode exhaust that would otherwise be recycled back to fuel cell assembly 10 and accumulate to a very high concentration level with a negative effect on stack and system performance. Typically, inert gas species, such as nitrogen and argon gases, come from fuel source 30 employing natural gas or other hydrocarbon fuel sources. Typically, natural gas contains inert gases from less than about 1% to over 10% inert gases. However, as anode exhaust recycles back to fuel cell assembly 10, the concentrations of such inert gas species fed into fuel cell assembly 10 can increase over time, potentially reducing fuel efficiency. Bleed conduit 95 can remove at least a portion of such inert gas species, keeping their concentration at fuel cell assembly 10 low.

Anode exhaust from bleed conduit 95 generally is directed to bleed exhaust 80. In a specific embodiment, anode exhaust from bleed conduit 95 generally is directed to bleed exhaust 80 through burner or air heat exchanger 90, such as, for example, a catalyst coated heat exchanger with integrated burner (see FIG. 5). Any suitable burner or air heat exchanger can be employed in the invention. Optionally, a catalytic burner that includes one or more catalysts for burning anode exhaust can be employed. Alternatively, the catalytic burner can be integrated with an air heat exchanger. When an air heat exchanger is employed, either alone or as an integrated part of a burner, specifically a catalytic burner, heat exchange can occur between fluid (e.g., anode exhaust) received from bleed conduit 95 and a second fluid having a lower temperature than the fluid received from bleed conduit 95. Suitable examples of the second fluid include air or oxygen-containing fluid from $O_2$ source 40.

In yet another specific embodiment, air heat exchanger 90, either alone or as an integrated part of a burner, specifically a catalytic burner, is employed downstream of bleed conduit 95; and air heat exchanger 90 is between, and in fluid communication with, oxygen source 40 and cathode 14 of fuel cell assembly 10. In this embodiment, oxygen in the cathode exhaust fed into air heat exchanger 90 can react with fuel from bleed conduit 95 before removal through bleed exhaust 80. Also, in addition, heat exchange can occur between the cathode exhaust and oxygen-containing fluid fed from $O_2$ source 40 to air heat exchanger 90, resulting in pre-heated oxygen-containing fluid. The pre-heated oxygen-containing fluid is fed into cathode 14 of fuel cell assembly 10.

In yet another specific embodiment, fuel cell system 1 further includes anode heat exchanger 100 at a portion of anode exhaust conduit 35 extending between fuel cell assembly 10 and $CO_2$-removal unit 20, in which heat exchange occurs between fluid of anode exhaust conduit (e.g., anode exhaust) and a second fluid having a lower temperature than the fluid of anode exhaust conduit 35. In an embodiment employing cooling unit 50 and/or water-gas-shift unit 70, anode heat exchanger 100 generally is located at a portion of anode exhaust conduit 35 extending between fuel cell assembly 10 and cooling unit 50, or between fuel cell assembly 10 and water-gas-shift unit 70. Suitable examples of the second fluid include fluid from recycle conduit 55 or recycle-fuel conduit 65, and a fuel stream from fuel source 30. In a further specific embodiment, anode heat exchanger 100 is at anode exhaust conduit 35, and at recycle conduit 55 or recycle-fuel conduit 65. In this embodiment, the second fluid is fluid from recycle conduit 55 or recycle-fuel conduit 65, and heat exchange occurs between the fluid of anode exhaust conduit 35 and the fluid from recycle conduit 55 or recycle-fuel conduit 65. In another further specific embodiment, anode heat exchanger 100 is at anode exhaust conduit 35, and at fuel conduit 45. In this embodiment, the second fluid is fluid from fuel conduit 45, and heat exchange occurs between the fluid of anode exhaust conduit 35 and the fluid from fuel conduit 45. Other types of fluid, such as air, water, and steam, can also be employed in the invention for the second fluid.

In yet another specific embodiment, fuel cell system 1 further includes reformer 110 and/or pre-reformer 120, which is in fluid communication with anode 12 of fuel cell assembly 10 and with fuel source 30. Reformer 110 and pre-reformer 120 include one or more catalysts to convert a fuel source, such as natural gas or other hydrocarbon fuel sources, into hydrogen gas. Pre-reformer 120 generally can remove heavy hydrocarbons to prevent carbon formation in reformer 110 or fuel cell assembly 10. Generally, fuel and recycle stream are fed into pre-reformer 120, and heavy hydrocarbons of the fuel are reformed to syngas by steam and carbon dioxide in the recycle stream. The syngas formed at pre-reformer 120 is then fed into reformer 110 and converted into hydrogen gas. Pre-former 120 generally operates at about 350° C. to 550° C. adiabatically. Un-reacted hydrocarbons of the fuel at pre-former 120 can be reformed in reformer 110. Alternatively, when high temperature fuel cell assembly 10 is employed (e.g., at a temperature over about 500° C.), the un-reacted hydrocarbons can be reformed at fuel cell assembly 10.

In the embodiment where reformer 110 and optionally pre-reformer 120 are employed, specifically, reformer 110 and pre-reformer 120 are at recycle-fuel conduit 65, or recycle and fuel conduits 55 and 45 (see FIG. 5). In this embodiment, recycled exhaust gas from recycle conduit 55 or recycle-fuel conduit 65 is directed to reformer 110 optionally via pre-reformer 120. When reformer 110 and pre-reformer 120 are at recycle-fuel conduit 65, fuel from fuel source 30 is combined with the recycled gas, and the combined gas stream is directed to reformer 110, as shown in FIG. 5. When reformer 110 and pre-reformer 120 are at recycle and fuel conduits 55 and 45d, fuel from fuel source 30 is directly in fluid communication with reformer 110 independently from the recycled exhaust gas stream.

Any suitable reformer and pre-reformer known in the art can be used in the invention. Specific examples of suitable reformers include steam reformers, auto-thermal reformers and partial oxidation reformers. A steam reformer using the recycle stream is preferred because autothermal reformers and partial oxidation reformers using air will bring inert gases into the anode of the SOFC system. Generally, an oxidizer is combined with the fuel (e.g., natural gas) to generate hydrogen gas and oxidized byproduct(s) (e.g., CO or $CO_2$). For the oxidizer, typically, steam reformers use steam, while partial oxidation reformers use oxygen gas, and auto-thermal reformers use both steam and oxygen gas.

Although a reformer, separate from fuel cell assembly 10, is depicted in FIG. 5, alternatively, fuel cell assembly 10 can include fuel cell(s) 11 that functions as an internally reforming fuel cell. Within such internally reforming fuel cell, reformation of natural gas or other hydrocarbon fuels into hydrogen gas can be accomplished. One example of such internally reforming fuel cell is a steam reforming fuel cell where hot steam in the recycle stream is used for the catalytic conversion of fuels into hydrogen and carbon monoxide gas.

Fuel cell system 1 can further include a power conditioner (not shown). Typically, fuel cells generate direct current electricity, which may require conditioning before serving. The power conditioner processes the electricity generated from fuel cells into, for example, alternating current or regulated direct current.

In some embodiments, fuel source is hydrogen gas itself. In these embodiments, reformer 110 and pre-former 120 are not required, and the hydrogen gas from fuel source 30 and the recycled anode exhaust are directly in fluid communication with anode 12 of fuel cell assembly 10.

Figure 6:
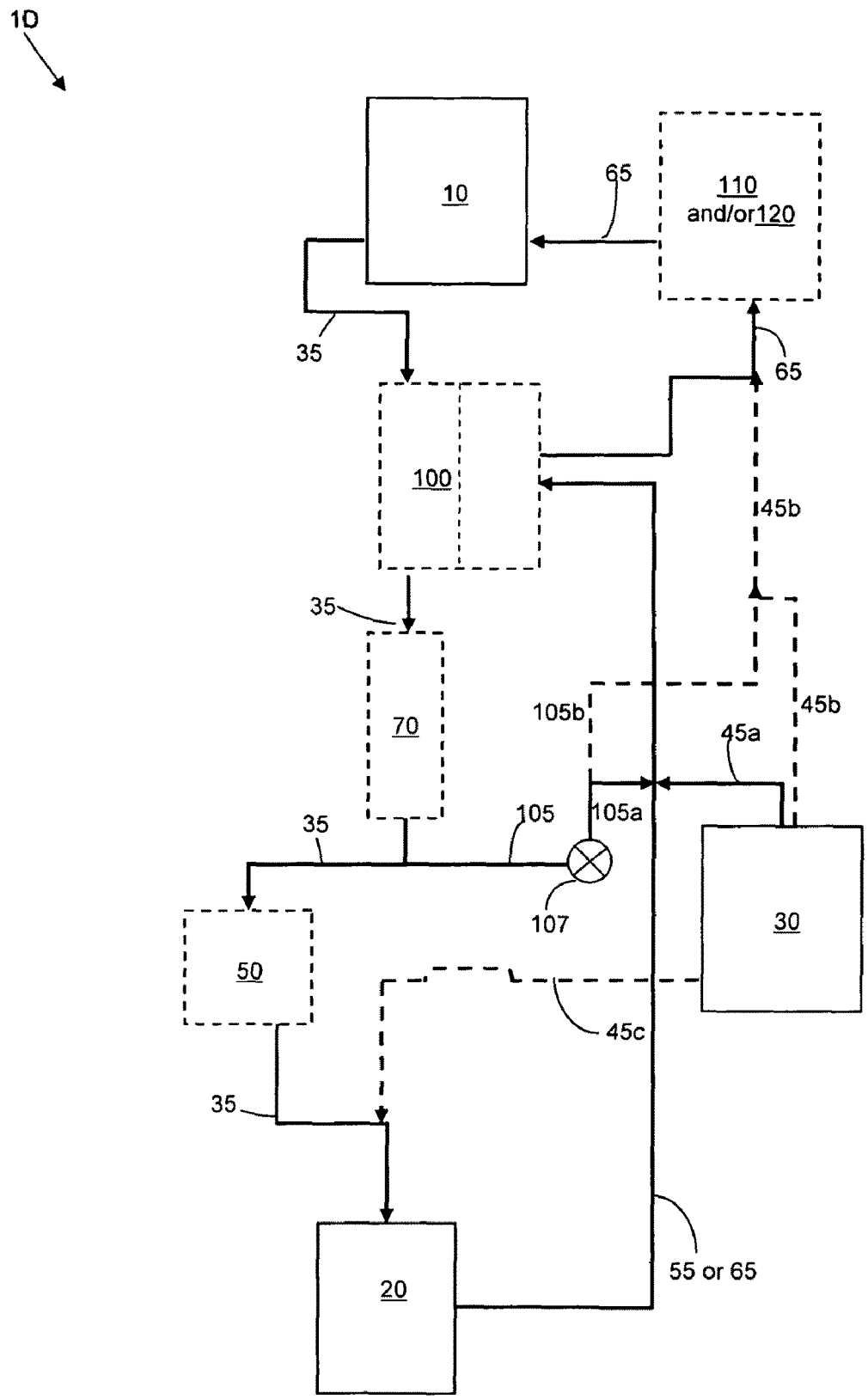
FIG. 6 is a schematic drawing of still another embodiment of a fuel cell system of the invention.

Referring to FIG. 6, in some embodiments, fuel cell system 1 includes by-pass conduit 105 branching from anode exhaust conduit 35 at a point between fuel cell assembly 10 and $CO_2$-removal unit 20, specifically between anode heat exchanger 100 and cooling unit 50, or between anode heat exchanger 100 and water-gas-shift unit 70 and cooling unit 50 (when these units are employed). By-pass conduit 105 extends either directly to fuel cell assembly 10 (not shown), or through at least one of recycle conduit 55 (depicted as route 105a in FIG. 6), recycle-fuel conduit 65 (depicted as route 105a in FIG. 6) and fuel conduit 45 (depicted as route 105b in FIG. 6), optionally via anode heat exchanger 100, reformer 110 and/or pre-reformer 120. In this embodiment, the rate of anode exhaust recycle can be controlled by adjusting control valve 107. Adjusting the anode exhaust recycle rate can, in turn, provide control of the water and carbon dioxide content of the anode exhaust. For clarity purposes, only certain components or units, and conduits are depicted in FIG. 6. It is noted that fuel cell system 1D of FIG. 6 can include one or more units or components, and conduits described above in fuel cell systems 1A-1C for FIGS. 1A, 1B and 5. Features, including specific features, of the units or components, and conduits, of fuel cell system 1D, which have not described in this paragraph, independently are as described for fuel cell systems 1A-1C for FIGS. 1A, 1B and 5.

In one specific embodiment, a fuel cell system of the invention employs water-gas-shift unit 70; and bleed conduit 95, in addition to component(s) and unit(s), and conduit(s) associated with them, described above for FIGS. 1A and 1B. Features, including features of water-gas-shift unit 70 and bleed conduit 95, are as described above for FIG. 5.

In yet another specific embodiment, a fuel cell system of the invention employs water-gas-shift unit 70; bleed conduit 95; and burner or air heat exchanger 90 downstream of bleed conduit 95, in addition to component(s) and unit(s), and conduit(s) associated with them, described above for FIGS. 1A and 1B. Features, including specific features of water-gas-shift unit 70, bleed conduit 95, and burner or air heat exchanger 90, each independently are as described above for FIG. 5.

In yet another specific embodiment, a fuel cell system of the invention employs water-gas-shift unit 70; bleed conduit 95; burner or air heat exchanger 90 downstream of bleed conduit 95; and cooling unit 50, in addition to component(s) and unit(s), and conduit(s) associated with them, described above for FIGS. 1A and 1B. Features, including specific features, of water-gas-shift unit 70, bleed conduit 95, and burner or air heat exchanger 90, each independently are as described above for FIG. 5. Features, including specific features of cooling unit 50, are as described above for FIGS. 1A, 1B and FIG. 5. Optionally, in this embodiment, by-pass conduit 105 branching from anode exhaust conduit 35 at a point between water-gas-shift unit 70 and cooling unit 50, as described above for FIG. 6, can be employed.

In yet another specific embodiment, a fuel cell system of the invention employs water-gas-shift unit 70; bleed conduit 95; burner or air heat exchanger 90 downstream of bleed conduit 95, cooling unit 50, and anode heat exchanger 100, in addition to component(s) and unit(s), and conduit(s) associated with them, described above for FIGS. 1A and 1B. Features, including specific features of water-gas-shift unit 70, bleed conduit 95, burner or air heat exchanger 90, and anode heat exchanger 100, each independently are as described above for FIG. 5. Features, including specific features of cooling unit 50, are as described above for FIGS. 1A, 1B and FIG. 5. Optionally, in this embodiment, by-pass conduit 105 branching from anode exhaust conduit 35 at a point between water-gas-shift unit 70 and cooling unit 50, as described above for FIG. 6, can be employed.

Figure 7:
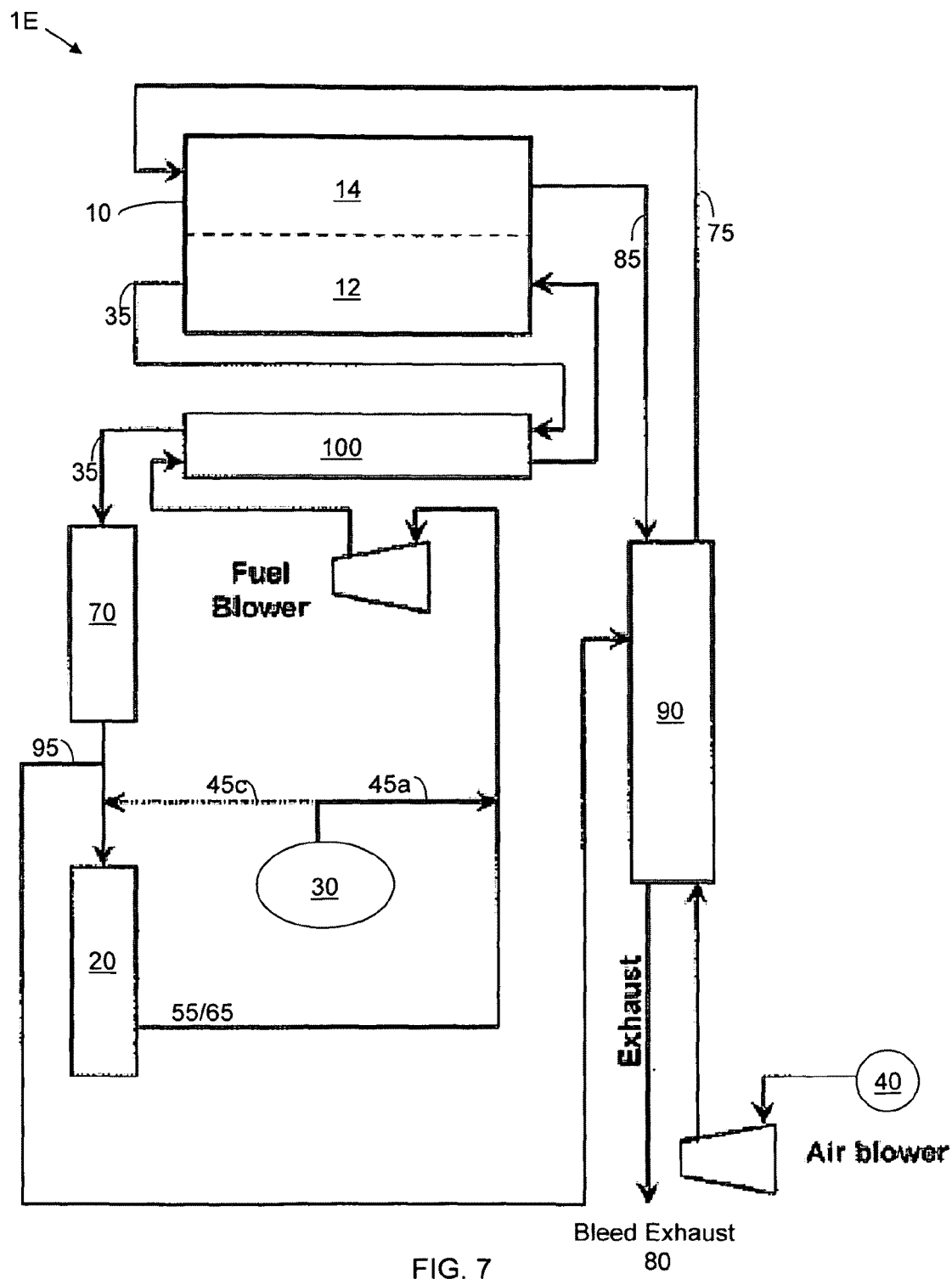
FIG. 7 is a schematic drawing of a still further embodiment of a fuel cell system of the invention.

FIG. 7 shows another specific embodiment of fuel cell system 1 that employs $CO_2$-removal unit 20; water-gas-shift unit 70; burner or air-heat-exchanger 90; and anode heat exchanger 100. In this embodiment, both fuel from fuel source 30 and fluid from $CO_2$-removal unit 20 can be directed to a fuel blower which, in turn, directs the incoming fluid to anode heat exchanger 100. Alternatively, as depicted in route 45c, both fuel from fuel source 30 and anode exhaust from fuel cell assembly 10 can be directed to $CO_2$-removal unit 20. When fuel from fuel source 30 is directed to fuel cell assembly 10 via $CO_2$-removal unit 20 (route 45c in FIG. 7), at least a portion of any $CO_2$ and water contained in the fuel can be removed at $CO_2$-removal unit 20. Also, depending upon $CO_2$-removing material 22, at least a portion of certain sulfur contaminants contained in the fuel can be removed at $CO_2$-removal unit 20. Although not shown in FIG. 7, optionally, reformer 110 and/or pre-reformer 120 can be further employed between anode heat exchanger 100 and fuel cell assembly 10, or integrated with anode heat exchanger 100.

Figure 8:
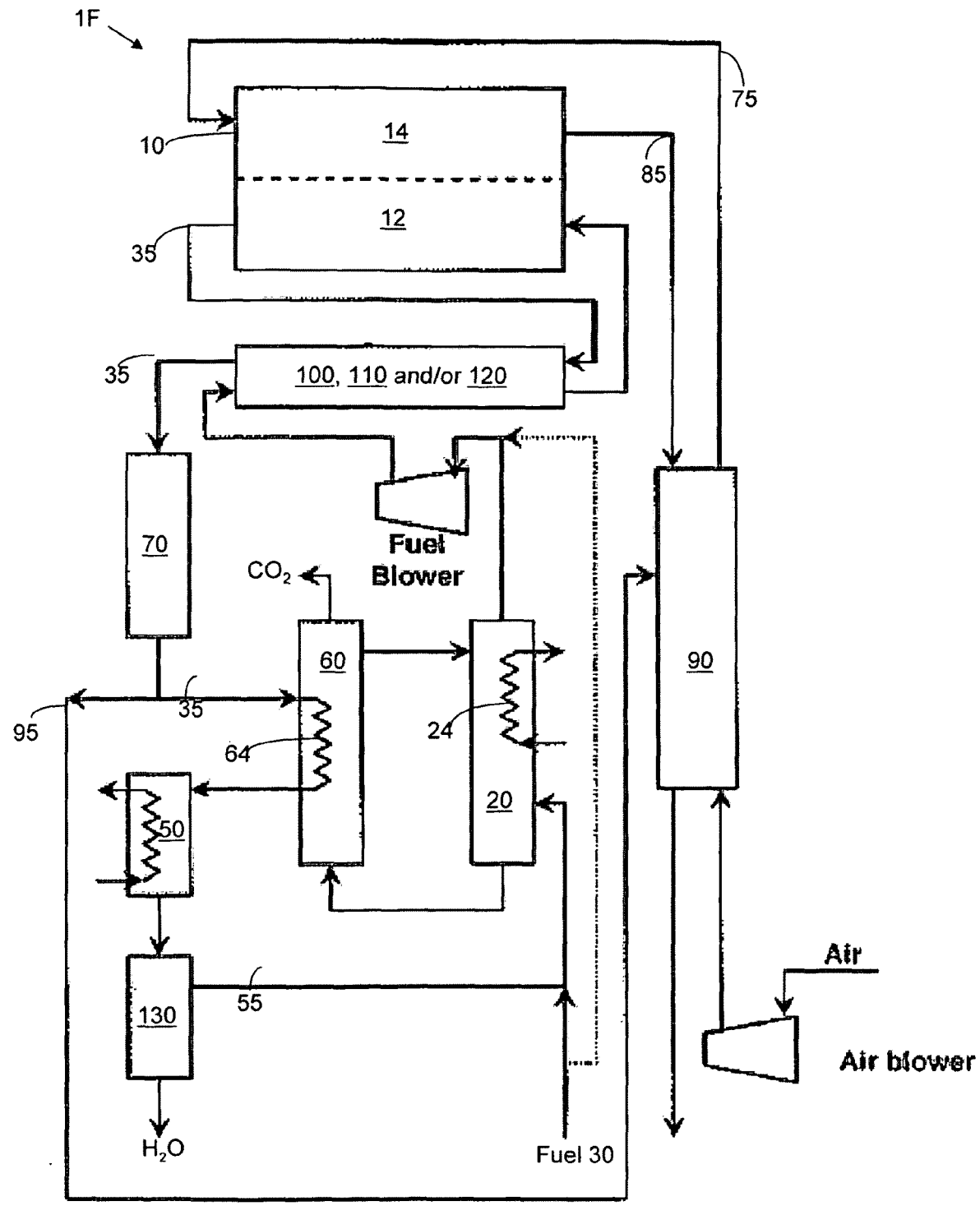
FIG. 8 is a schematic drawing of another embodiment of a fuel cell system of the invention.

FIG. 8 shows another specific embodiment of fuel cell system 1 that employs $CO_2$-removal unit 20; cooling unit 50; regeneration unit 60; water-gas-shift unit 70; burner or air heat exchanger 90; anode heat exchanger 100; and separator 130 that includes a gas-liquid separator or membrane selectively permeable to water. As shown in FIG. 8, a portion of anode exhaust conduit 35 between water-gas-shift unit 70 and cooling unit 50 functions as heating component 64 of regeneration unit 60. In this embodiment, both fuel from fuel source 30 and fluid from $CO_2$-removal unit 20 can be directed to a fuel blower which, in turn, directs the incoming fluid to anode heat exchanger 100. Alternatively, as depicted with route 45c, both fuel from fuel source 30 and anode exhaust from fuel cell assembly 10 can be directed to $CO_2$-removal unit 20. When fuel from fuel source 30 is directed to fuel cell assembly 10 via $CO_2$-removal unit 20 (route 45c in FIG. 7), at least a portion of any $CO_2$ contained in a fuel such as biogas can be removed at $CO_2$-removal unit 20. Also, depending upon $CO_2$-removing material 22, at least a portion of certain sulfur contaminants contained in the fuel can be removed at $CO_2$-removal unit 20. Although not shown in FIG. 8, optionally, reformer 110 and/or pre-reformer 120 can be further employed between anode heat exchanger 100 and fuel cell assembly 10.

Figure 9:
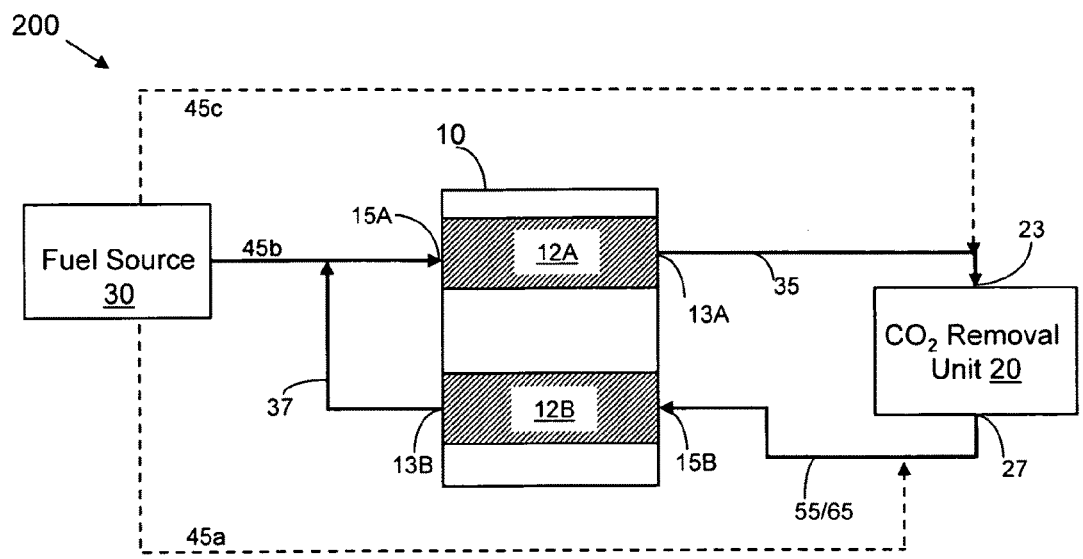
FIG. 9 is a schematic drawing of still another embodiment of a fuel cell system of the invention.

FIG. 9 shows one specific embodiment of fuel cells of the invention, fuel cell 200. In fuel cell 200, fuel cell assembly 10 includes first fuel cell 11A including anode 12A, and second fuel cell 11B including anode 12B in a stack (for clarity purposes, only anode 12A of fuel cell 11A, and anode 12B of fuel cell 11B are depicted in the figure). Anode 12A includes outlet 13A and inlet 15A. Anode 12B includes outlet 13B and inlet 15B. In this embodiment, outlet 13A of anode 12A is in fluid communication with inlet 23 of $CO_2$-removal unit 20 via anode exhaust conduit 35; inlet 15B of anode 12B is in fluid communication with recycle gas outlet 27 of $CO_2$-removal unit 20 via recycle conduit 55 or recycle-fuel conduit 65, as shown in FIG. 9. In a specific embodiment, anode exhaust from outlet 13B of anode 12B of second fuel cell 11B is directed to inlet 15A of anode 12A of first fuel cell 11A via second anode exhaust conduit 37. Fuel from fuel source 30 can be directed to anode 12A of first fuel cell 11A directly (depicted as route 45b in FIG. 9), or via $CO_2$-removal unit 20 (depicted as route 45c in FIG. 9), or via anode 12B of second fuel cell 11B (depicted as route 45a in FIG. 9). In FIG. 9, for clarity purposes, other component(s) or unit(s) (e.g., $O_2$ source 40, cooling unit 50, regeneration unit 60, water-gas-shift unit 70, burner or air-heat exchanger 90, anode heat exchanger 100, reformer 110, pre-reformer 120, etc.) of fuel cell system 200, and conduit(s) associated with them are not depicted. Fuel cell system 200 can include one or more of these components or units, and conduit(s) associated with them, as described above for fuel cell systems 1A-1F for FIGS. 1A, 1B and 5-8. Features, including specific features, of each component of fuel cell system 200 are as described for fuel cell systems 1A-1F for FIGS. 1A, 1B and 5-8.

Figure 10:
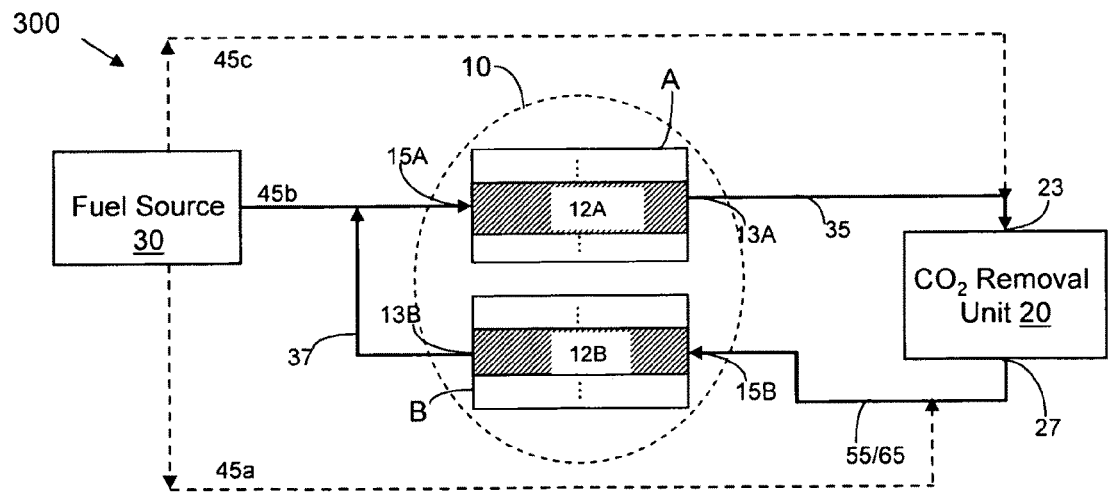
FIG. 10 is a schematic drawing of a still further embodiment of a fuel cell system of the invention.

FIG. 10 shows another specific embodiment fuel cells of the invention, fuel cell 300. In fuel cell 300, fuel cell assembly 10 includes a first stack A and a second stack B. First fuel cell 11A of first stack A includes anode 12A, and second fuel cell 11B of second stack B includes anode 12B (for clarity purposes, only anode 12A of fuel cell 11A, and anode 12B of fuel cell 11B are depicted in the figure). Anode 12A includes outlet 13A and inlet 15A. Anode 12B includes outlet 13B and inlet 15B. In this embodiment, outlet 13A of anode 12A of first stack A is in fluid communication with inlet 23 of $CO_2$-removal unit 20 via anode exhaust conduit 35; inlet 15B of anode 12B of second stack B is in fluid communication with recycle gas outlet 27 of $CO_2$-removal unit 20 via recycle conduit 55 or recycle-fuel conduit 65, as shown in FIG. 10. In a specific embodiment, anode exhaust from outlet 13B of anode 12B of second fuel cell 11B is directed to inlet 15A of anode 12A of first fuel cell 11A via second anode exhaust conduit 37. As discussed above for FIG. 9, fuel from fuel source 30 can be directed to anode 12A of first fuel cell 11A directly (depicted as route 45b in FIG. 10), or via $CO_2$-removal unit 20 (depicted as route 45c in FIG. 10), or via anode 12B of second fuel cell 11B (depicted as route 45a in FIG. 10). As with FIG. 9, in FIG. 10, for clarity purposes, other components (e.g., $O_2$ source 40, cooling unit 50, regeneration unit 60, water-gas-shift unit 70, burner or air-heat exchanger 90, anode heat exchanger 100, reformer 110, pre-reformer 120, etc.) of fuel cell system 300 are not depicted. It is noted that fuel cell system 300 can include one or more of these components, as described above for fuel cell systems 1A-1F. Features, including specific features, of each component of fuel cell system 300 are as described for fuel cell systems 1A-1F.

Fuel cell systems of the invention can be made by any suitable method known in the art. Any suitable anode and cathode materials known in the art can be used in the invention. Specific examples of the cathode materials include includes a La-manganate based material (e.g., $La_{1-x}MnO_3$, where x=0-0.1). In a specific embodiment, the La-manganate based materials are doped with one or more suitable dopants, such as Sr, Ca, Ba or Mg. Examples of doped La-manganate based materials include LaSr-manganates (e.g., $La_{1-x}Sr_xMnO_3$, where x=0.1-0.3, (La+Sr)/Mn=1.0-0.95 (molar ratio)) and LaCa-manganates (e.g., $La_{1-x}Ca_xMnO_3$, where x=0.1-0.3, (La+Ca)/Mn=1.0-0.95 (molar ratio)). Specific examples of the anode materials include a Ni cermet. The "Ni cermet" generally refers to a ceramic metal composite that includes Ni, such as about 20 wt %-70 wt % of Ni. Examples of Ni cermets are materials that include Ni and yttria-stabilized zirconia (YSZ), such as $ZrO_2$ containing about 15 wt % of $Y_2O_3$, and materials that include Ni and YSr-zirconia.

Any suitable electrolyte material known in the art can be used for electrolyte 18 of the invention. Preferably, electrolyte 18 is a solid electrolyte. Specific examples include $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}CO_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}Ga_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brownmillerites (e.g., $Ba_2In_2O_6$ or $Ba_2In_2O_5$).

Any suitable thickness of anode 12 and cathode 14 can be employed in the invention. In one specific embodiment, the thickness of anode 14 and cathode 16 is each independently in a range of between about 0.5 mm and about 2 mm.

Any suitable thickness of electrolyte 16 can be employed in the invention. In one specific embodiment, the thickness of electrolyte 16 is in a range of between about 5 μm and about 20 μm, such as between about 5 μm and about 10 μm. In another specific embodiment, the thickness of electrolyte 16 is thicker than about 100 μm.

Referring back to FIGS. 1A, 1B and 5-8, although not shown in these figures, when a plurality of fuel cells 11 are employed, fuel cell assembly 10 further includes an interconnect between fuel cells 11. Any suitable interconnect can be used in the invention. In a specific embodiment, the interconnect is a metal oxide interconnect, such as ceramic interconnect. Alternatively, the interconnect can be a metal interconnect.

In another embodiment, the present invention is directed to a method of recycling anode exhaust in a fuel cell system. In the method, anode exhaust including carbon dioxide is directed from at least one said fuel cell to a carbon-dioxide-removal unit that includes a carbon-dioxide-removing material. At the carbon-dioxide-removal unit, at least a portion of gaseous carbon dioxide is removed from the anode exhaust with the carbon-dioxide-removing material to thereby form carbon dioxide-deficient anode exhaust. Essentially all of the carbon dioxide-deficient anode exhaust is directed to at least one said fuel cell of the fuel cell assembly to thereby recycle the anode exhaust. In one embodiment, the carbon-dioxide-removal unit further removes at least a portion of sulfur from a fuel gas. In another embodiment, the method further includes the step of converting at least a portion of carbon monoxide and water from the anode exhaust into carbon dioxide and hydrogen at a water-gas-shift unit that includes one or more catalysts that convert water and carbon monoxide into hydrogen and carbon dioxide, prior to removing carbon dioxide from the anode exhaust. In a specific embodiment, the method further includes the steps of directing at least a portion of the anode exhaust that has gone through the water-gas-shift unit to a bleed exhaust, and directing the rest of the anode exhaust to the carbon-dioxide-removal unit. In another specific embodiment, the portion of the anode exhaust that is directed to the bleed exhaust is directed to the bleed exhaust via an air heat exchanger, and the method further includes the step of directing an oxygen stream from an oxygen source to the at least one said fuel cell via the air heat exchanger whereby heat exchange occurs between the anode exhaust and the oxygen stream. In yet another embodiment, the method further includes the step of directing cathode exhaust from at least one said fuel cell to the air heat exchanger to oxidize fuel in the bleed exhaust. In another embodiment, the method further includes the step of cooling the anode exhaust directed from the water-gas-shift unit to the carbon-dioxide-removal unit at a cooling unit, prior to the removal of carbon dioxide at the carbon-dioxide-removal unit, to thereby remove at least a portion of water from the anode exhaust. In a specific embodiment, the carbon dioxide removal at the carbon-dioxide-removal unit occurs while cooling the anode exhaust at the carbon-dioxide-removal unit. In another embodiment, the method further includes the step of regenerating spent carbon-dioxide-removing material to form a regenerated carbon-dioxide-removing material. In a specific embodiment, the spent carbon-dioxide-removing material is regenerated at a regeneration unit of the fuel cell system, the regeneration unit including the spent carbon-dioxide-removing material. In one embodiment, a bubble pump is used to circulate carbon-dioxide-removing material between the carbon-dioxide-removal unit and the regeneration unit. In another embodiment, the anode exhaust is directed from the fuel cell assembly to the carbon-dioxide-removal unit, passing by the regeneration unit prior to the cooling step at the cooling unit, and wherein the spent carbon-dioxide-removing-material is regenerated with heat of anode exhaust passing by the regeneration unit. In some embodiments, the fuel cell assembly includes a first fuel cell and a second fuel cell. In some specific embodiments, the anode exhaust from the first fuel cell is directed to the carbon-dioxide-removal unit, and the carbon dioxide-deficient anode exhaust is directed to the second fuel cell. In some embodiments, the carbon-dioxide-removing-material is a carbon-dioxide absorbent or a membrane that is selectively permeable to at least carbon dioxide. In some specific embodiments, the membrane is selected from the group consisting of at least one of polymer, ceramic, and glass membranes, and the carbon-dioxide-removing-material is a carbon-dioxide absorbent selected from the group consisting of monoethanolamine, diethanolamine, triethanolamine, methyl-diethanolamine, di-isopropanolamine, 2-amino-2-methyl-1-propanol, and alkaline or alkaline-earth metal carbonate.

Exemplification

Fuel Cell System Employing Mono-Ethanol Amine (MEA) for the $CO_2$-Removal Unit

In this example, a kW (kilo watt) solid oxide fuel cell (SOFC) system with about 50% electric efficiency is designed with $CO_2$-removal unit 20 that includes absorber 22 including MEA and with structured packing or a packing material, like Pall Rings; and heat exchanger for cooling component 24. The SOFC system of this example also includes regeneration unit 60 that includes regenerator 62, heat exchanger as heating component 64; a bubble pump is used for liquid circulating between the carbon-dioxide-removal unit and the regeneration unit; heat exchanger for cooling component 66. $CO_2$-removal unit 20 and regeneration unit 60 of this example have the following specifications:

Fuel: natural gas $CO_2$ component flow rate in anode exhaust: about 0.01 kgmol/hr=about 0.44 kg/hr=about 4 slpm MEA concentration of an absorption solution: about 15 wt %-50 wt % MEA.

$CO_2$ capture capacity: about 0.3 mole $CO_2$/mole MEA

MEA solution circulation rate: about 4.1 kg/hr

Absorption temperature of MEA absorption solution: between about 20° C. and 60° C.

Regeneration temperature of spent MEA: between about 80° C. and about 150° C.

The absorber, regenerator and heat exchangers can be made of completely deoxidized carbon steel or stainless steel. Packing materials can be stainless steel, ceramics or plastic. The absorber can be about 0.05 m in diameter and about 1 m in height. The regenerator can be about 0.025 m in diameter and about 1 m in height.

Equivalents

While this invention has been particularly shown and described with references to example embodiments thereof, it will be understood by those skilled in the art that various changes in form and details may be made therein without departing from the scope of the invention encompassed by the appended claims.

What is claimed is:

1. A fuel cell system, comprising:
a fuel cell assembly that includes at least one fuel cell, each fuel cell including an anode and a cathode;
a carbon-dioxide-removal unit adapted to remove carbon dioxide that is in a gas phase, the carbon-dioxide-removal unit including a carbon-dioxide-removing material;
an anode exhaust conduit connecting the fuel cell assembly and the carbon-dioxide-removal unit;
a fuel source and an oxygen source, each independently in fluid communication with the fuel cell assembly;
a fuel conduit connecting the fuel source to, at least in part, the fuel cell assembly;
a recycle conduit connecting the carbon-dioxide-removal unit with at least one of the fuel cell assembly, the fuel conduit and the fuel source, wherein the recycle conduit is merged with the fuel conduit into a single recycle-fuel conduit that extends to the fuel cell assembly, the recycle-fuel conduit to direct essentially all gaseous fluid from the carbon-dioxide-removal unit to the fuel cell assembly;
a regeneration unit in fluid communication with the carbon-dioxide-removal unit, the regeneration unit adapted to regenerate spent carbon-dioxide-removing material, wherein the regeneration unit further includes a heating component for heating spent carbon-dioxide-removing material, and wherein at least a portion of the anode exhaust conduit between the fuel cell assembly and the carbon-dioxide-removal unit covers at least a portion of the regeneration unit and functions as the heating component.

2. The fuel cell system of claim 1, wherein the carbon-dioxide-removal unit further removes at least a portion of water from an anode exhaust.

3. The fuel cell system of claim 1, wherein the carbon-dioxide removal unit further removes at least a portion of sulfur compounds from a fuel gas.

4. The fuel cell system of claim 1, further including a water-gas-shift unit that includes one or more catalysts that convert water and carbon monoxide into hydrogen and carbon dioxide, wherein the water-gas-shift unit is at a portion of the anode exhaust conduit extending between the fuel cell assembly and the carbon-dioxide-removal unit.

5. The fuel cell system of claim 4, further includes a bleed conduit branching from the anode exhaust conduit at a point between the fuel cell assembly and the fuel source, wherein the bleed conduit directs at least a portion of fluid from the anode exhaust conduit to a bleed exhaust.

6. The fuel cell system of claim 5, further including an air-heat-exchanger unit at a point downstream of the bleed conduit, in which heat exchange occurs between fluid received from the bleed conduit and a second fluid having a lower temperature than the fluid received from the bleed conduit.

7. The fuel cell system of claim 6, wherein the air-heat-exchanger unit is between, and in fluid communication with, the oxygen source and the cathode of the fuel cell assembly, and wherein oxygen-containing fluid from the oxygen source is the second fluid.

8. The fuel cell system of claim 5, further including a cooling unit at a portion of the anode exhaust conduit extending between the fuel cell assembly and the carbon-dioxide-removal unit.

9. The fuel cell system of claim 8, wherein the cooling unit is between the water-gas-shift unit and the carbon-dioxide-removal unit.

10. The fuel cell system of claim 8, wherein the carbon-dioxide-removal unit further includes a cooling component.

11. The fuel cell system of claim 1, wherein the carbon-dioxide-removal unit includes a housing, and wherein the housing further defines a carbon-dioxide-removing-material inlet and a carbon-dioxide-removing-material outlet, wherein the regeneration unit is in fluid communication with the carbon-dioxide-removing-material outlet and with the carbon-dioxide-removing-material inlet.

12. The fuel cell system of claim 11, wherein the regeneration unit further includes a cooling component that lowers the temperature of regenerated carbon-dioxide-removing material.

13. The fuel cell system of claim 12, further including a by-pass conduit branching from the anode exhaust conduit at a point between the water-gas-shift unit and cooling unit, wherein the by-pass conduit extends either directly to the fuel cell assembly, or via at least one of the recycle conduit, the fuel conduit and the recycle-fuel conduit, by-passing the carbon-dioxide-removal unit.

14. The fuel cell system of claim 1, wherein the portion of the anode exhaust conduit which functions as the heating component is an anode heat exchanger, and in which heat exchange occurs between fluid of the anode exhaust conduit and a second fluid having a lower temperature than the fluid of the anode exhaust conduit.

15. The fuel cell system of claim 14, wherein the anode heat exchanger is at the anode exhaust conduit, and at the recycle conduit, recycle-fuel conduit or the fuel conduit, and wherein the heat exchange occurs between the fluid of the anode exhaust conduit and the fluid of the recycle conduit, recycle-fuel conduit or the fuel conduit.

16. The fuel cell system of claim 1, further including a reformer or pre-former that includes a catalyst that converts fuel gas into hydrogen gas, wherein the reformer or pre-former is either at the recycle-fuel conduit or at the recycle and the fuel conduits.

17. The fuel cell system of claim 1, wherein the fuel conduit and the recycle conduit are merged into the recycle-fuel conduit at a position between the carbon-dioxide-removal unit and the anode heat exchanger, or between the anode heat exchanger, and the reformer or pre-reformer.

18. The fuel cell system of claim 1, wherein the fuel cell assembly includes a first fuel cell and a second fuel cell, wherein the first fuel cell includes a first anode inlet and a first anode outlet, each of the first anode inlet and the first anode outlet independently being in fluid communication with the anode of the first fuel cell, wherein the second fuel cell includes a second anode inlet and a second anode outlet and wherein each of the second anode inlet and the second anode outlet independently are in fluid communication with the anode of the second fuel cell.

19. The fuel cell system of claim 18, wherein the first anode outlet of the first fuel cell is in fluid communication with a carbon dioxide inlet of the carbon-dioxide-removal unit via the anode exhaust conduit, and wherein the second anode inlet of the second fuel cell is in fluid communication with an outlet of the carbon-dioxide-removal unit via the recycle or recycle-fuel conduit.

20. The fuel cell system of claim 19, wherein the first anode inlet of the first fuel cell is in fluid communication with the fuel source through the fuel conduit.

21. The fuel cell system of claim 20, further including a second exhaust conduit connecting the second anode outlet of the second fuel cell to the first anode inlet of the first fuel cell.

22. The fuel cell system of claim 21, wherein the fuel cell conduit and the second exhaust conduit are merged into a single conduit that extends to the first anode inlet of the first fuel cell.

23. The fuel cell system of claim 1, wherein the carbon-dioxide-removing-material is a carbon-dioxide absorbent.

24. The fuel cell system of claim 23, wherein the carbon-dioxide absorbent is selected from the group consisting of monoethanolamine, diethanolamine, triethanolamine, methyl-diethanolamine, di-isopropanolamine, 2-amino-2-methyl-1-propanol, and alkaline or alkaline earth metal carbonate.

* * * * *